Apr. 24, 1923.

J. W. MAINWARING

PISTON RING HOLDER

Filed July 7, 1922

1,452,518

Inventor
JOHN W. MAINWARING
By his Attorneys
Sheffield & Betts

Patented Apr. 24, 1923.

1,452,518

UNITED STATES PATENT OFFICE.

JOHN W. MAINWARING, OF BROOKLYN, NEW YORK.

PISTON-RING HOLDER.

Application filed July 7, 1922. Serial No. 573,368.

*To all whom it may concern:*

Be it known that I, JOHN W. MAINWARING, a citizen of the United States, and residing in the borough of Brooklyn, in the county of Kings, city and State of New York, have invented certain new and useful Improvements in Piston-Ring Holders, of which the following is a full, true, and complete description.

My invention relates to tools for holding objects to be filed or otherwise trimmed.

The principal object of my invention is to provide a tool which will ensure accuracy in filing or otherwise trimming a piston ring or other small article and which will also enable such a piece of work to be performed more conveniently than can be done with tools now in use.

Further objects and advantages of my invention will be apparent to those skilled in the art from the following description taken in connection with the accompanying drawing in which—

Figure 1:
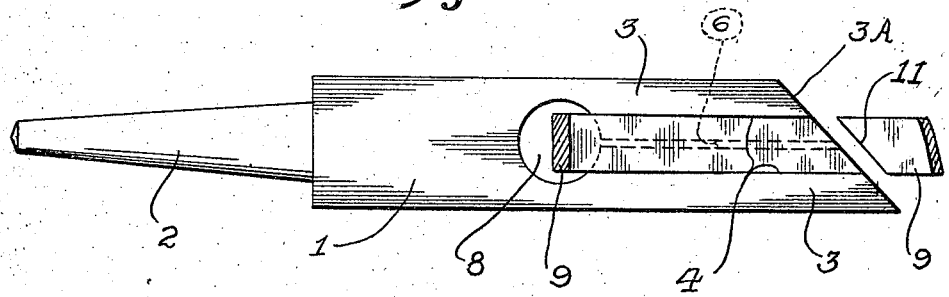
Fig. 1 is an elevation of a holder according to my invention illustrating it in connection with a piston ring arranged in position to be filed, part of the piston ring being broken away for purposes of illustration.
Figure 2:
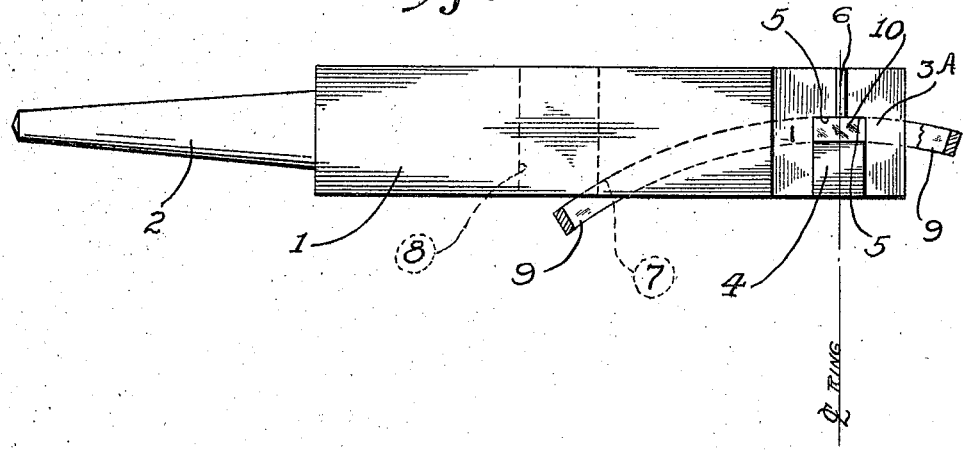
Fig. 2 is a plan view of the holder and ring illustrated in Fig. 1.
Figure 3:
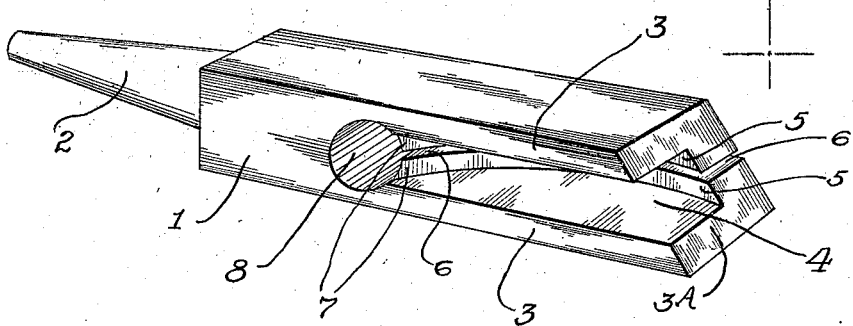
Fig. 3 is a perspective view of the holder illustrated in Figs. 1 and 2, the ring being omitted in Fig. 3.

Referring to the drawing in detail, 1 designates the stock of a device according to my invention, the stock having a shank 2 extending therefrom in order that a handle may be attached thereto. At the end opposite the shank 2, stock 1 is extended forward in two parallel spaced jaws 3, there being a space 4 between the jaws for receiving an article, such as a piston ring to be filed. The jaws 3 preferably have flanges 5 thereon at one side of the space 4, flanges 5 being separated by the space 6 between the jaws; and the sides of the flanges 5 on the face toward the space 4 are preferably curved as indicated at 7, to define the arc of a circle of the same diameter as the outside of the piston ring or like article to be filed when held in the device according to my invention. The proper position of a piston ring or other article to be trimmed can thus be readily determined so that the trimmed surface may be true in both the transverse and radial directions. However, I do not limit myself to the use of circular or cylindrical flanges for this purpose, as it is evident that the same general result can be attained by means defining the arc of the circle at two points, one at or adjacent to the forward ends of the jaws 3, and one at or near the rear ends of these jaws. The free ends of the jaws 3 and flanges 5 are ground or otherwise suitably finished to determine a plane 3^A which makes an angle with the longitudinal axis of stock 1 such as to determine the proper bevel or angle of the surface of the piston ring or other article to be trimmed when held in the device. The stock and jaws 3 are preferably formed of tool steel and the height of the opening 4 when the device is viewed as in Fig. 1 is made normally exactly the same as or slightly less than the corresponding dimension of the piston ring or other article, designed to be held by the device. Consequently, the jaws 3 must be sprung apart slightly when the article to be trimmed is inserted in space 4, the resiliency of the jaws thereupon holding the article firmly in place. In the form of device illustrated in the drawing sufficient resiliency to permit the ready insertion of the article between the jaws is provided by drilling a hole 8 through the device, the axis of the hole 8 lying in the central plane of the slot 6 and at right angles to the axis of the stock 1. The device according to my invention is illustrated in Figs. 1 and 2 in connection with a piston ring 9 which is held therein in such position that it may be filed so that its end 10 is flush with the surface 3^A and parallel to the other end 11 of the ring 9.

As previously indicated, the plane 3^A insures that the surface 10 shall be parallel with the edge of the end 11 in one direction, while the curve 7 of the flanges 5 insures, if the ring is pressed against these flanges, that the surface 10 shall be true in the radial direction. It will be obvious also to those accustomed to trimming piston rings or other objects that a ring held in a device according to my invention may not only be filed accurately, even by one who is not a skilled mechanic, but may be finished in the minimum of time and with the maximum of convenience, owing to the fact that it does not need to be placed in a vise or the like but may be filed when the ring is held in the device, the device being merely held by one hand and steadied against a convenient object such as the cylinder of the engine in which the ring is to be placed.

While I have illustrated and described a device according to the preferred form of my invention, I do not wish to be limited to the details of my disclosure herein except in so far as such details are essential to the novelty of the appended claims.

Having thus described my invention, I claim:

1. A device for holding an article to be trimmed comprising a stock, and two spaced jaws for holding the article to be trimmed, said jaws being fixed to said stock and yieldingly resisting a separating pressure whereby they clamp and hold an article forced between them, said jaws being cut away in a manner permitting the insertion of work to be trimmed from the side of said jaws, the outer ends of said jaws determining a plane.

2. A device for holding an article to be trimmed, comprising a stock, two spaced jaws for holding the article to be trimmed, said jaws being fixed to said stock and yieldingly resisting a separating pressure whereby they clamp and hold an article forced between them, the outer ends of said jaws determining a plane, and means whereby the proper position of the article to be trimmed may be determined with respect to the plane of the outer ends of said jaws.

3. A device for holding an article to be trimmed comprising a stock, two spaced jaws for holding the article to be trimmed, said jaws being fixed to said stock and yieldingly resisting a separating pressure whereby they clamp and hold an article forced between them, the outer ends of said jaws determining a plane, and means whereby the proper position, between said jaws, of the article to be trimmed may be determined.

4. A device for use in filing the ends of a diagonally split piston ring comprising a stock, and two spaced jaws for holding the piston ring, said jaws being fixed to said stock and yieldingly resisting a separating pressure, whereby they clamp and hold the piston ring, the ends of said jaws lying in a given plane inclined to the longitudinal axis of said stock.

5. A device for use in filing the ends of a diagonally split piston ring comprising a stock, two spaced jaws for holding the piston ring, said jaws being fixed to said stock and yieldingly resisting a separating pressure, whereby they clamp and hold the piston ring, the ends of said jaws lying in a given plane inclined to the longitudinal axis of said stock, and means whereby the proper position between said jaws of the ring may be determined.

6. A device for use in filing the ends of a diagonally split piston ring comprising a stock, two spaced jaws for holding the piston ring, said jaws being fixed to said stock and yieldingly resisting a separating pressure, whereby they clamp and hold the piston ring, the angle between the planes of the clamping surfaces of said jaws and the surfaces of the ends of said jaws being the same as the angle between the split in the ring and the plane of the ring, and curved flanges on said jaws perpendicular to the clamping surfaces thereof and having the same radius of curvature as the outside of the piston ring.

7. A device for holding an article to be trimmed comprising a stock, two spaced jaws for holding the article to be trimmed, said jaws being fixed to said stock and yieldingly resisting a separating pressure whereby they clamp and hold an article forced between them, said jaws being cut away in a manner permitting the insertion of work to be trimmed from the side of said jaws, the outer ends of said jaws determining a plane, and means defining at least two points on a circle, and associated with said jaws for determining the proper position of a ring to be trimmed when the ring is held between the jaws.

JOHN W. MAINWARING.